United States Patent
Heim et al.

(10) Patent No.: US 8,947,807 B2
(45) Date of Patent: Feb. 3, 2015

(54) INDEPENDENTLY DRIVEN WRITE COILS

(71) Applicant: Seagate Technology LLC, Cupertino, CA (US)

(72) Inventors: Kevin Richard Heim, Eden Prairie, MN (US); Kirill A. Rivkin, Edina, MN (US); Eric Meloche, Burnsville, MN (US); John Wolf, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/722,724

(22) Filed: Dec. 20, 2012

(65) Prior Publication Data

US 2014/0177083 A1    Jun. 26, 2014

(51) Int. Cl.
*G11B 5/09* (2006.01)
*G11B 5/127* (2006.01)
*G11B 5/012* (2006.01)
*G11B 5/02* (2006.01)
*G11B 5/31* (2006.01)

(52) U.S. Cl.
CPC ........ *G11B 5/012* (2013.01); *G11B 5/02* (2013.01); *G11B 5/3123* (2013.01)
USPC .............................................. 360/46; 360/110

(58) Field of Classification Search
None
See application file for complete search history.

(56) References Cited

U.S. PATENT DOCUMENTS

| | | | |
|---|---|---|---|
| 3,154,767 A | 10/1964 | Shook | |
| 3,217,301 A | 11/1965 | Shook | |
| 3,409,900 A * | 11/1968 | Markakis | 360/67 |
| 6,483,662 B1 | 11/2002 | Thomas et al. | |
| 6,563,674 B1 * | 5/2003 | Honda | 360/234.5 |
| 7,190,552 B2 | 3/2007 | Hsiao et al. | |
| 7,440,213 B2 * | 10/2008 | Amin et al. | 360/66 |
| 2007/0236819 A1 * | 10/2007 | Hashizume | 360/67 |
| 2008/0112080 A1 * | 5/2008 | Lengsfield et al. | 360/125.04 |
| 2008/0151406 A1 * | 6/2008 | Takahashi | 360/46 |
| 2008/0186628 A1 | 8/2008 | Hsiao et al. | |
| 2008/0259498 A1 | 10/2008 | Lengsfield et al. | |
| 2010/0157462 A1 * | 6/2010 | Koizumi et al. | 360/71 |

FOREIGN PATENT DOCUMENTS

| | | | |
|---|---|---|---|
| JP | 06036223 A * | 2/1994 | |
| JP | 07182718 A * | 7/1995 | |
| JP | 2004-071113 A | 3/2004 | |
| JP | 2004-164783 A | 6/2004 | |
| JP | 2004-241105 A | 8/2004 | |
| JP | 2009-048719 A | 3/2009 | |

* cited by examiner

*Primary Examiner* — Daniell L Negron
(74) *Attorney, Agent, or Firm* — HolzerIPLaw, PC

(57) ABSTRACT

A writer assembly having two separately driven write coils allows a combined write field generated by the writer assembly to be fine tuned and optimized for a particular application. Two preamplifiers may be incorporated into a printed circuit board in order to separately drive the write coils. In other implementations, there may be more than two write coils and corresponding preamplifiers.

14 Claims, 5 Drawing Sheets

INDEPENDENTLY DRIVEN WRITE COILS

BACKGROUND

A hard disc drive (i.e., a HDD) is a block-based data storage device that stores and retrieves digital information using non-volatile memory within one or more rotating platters of the HDD. The typical HDD includes one or more writer assemblies that fly above a corresponding platter surface and transform electrical currents into a magnetic fields to write data to the platters of the HDD.

A preamplifier applies the desired electrical current through one or more write coils connected in series within each writer assembly. The write coils within each writer assembly function to transform the electrical current into a magnetic field and direct the resulting magnetic flux density through a write pole to write data to the platters of the HDD. Since each of the one or more write coils are wound in series within each writer assembly, there is no capability to tune the write current individually to each of the write coils within each writer assembly of the HDD.

SUMMARY

Implementations described and claimed herein address the foregoing problems by independently driving at least two write coils within a writer assembly using separate preamplifiers.

Implementations described and claimed herein further address the foregoing problems by providing a writer assembly comprising: a first write coil independently driven by a first preamplifier; and a second write coil independently driven by a second preamplifier.

Implementations described and claimed herein still further address the foregoing problems by providing a system comprising: a printed circuit board including a first preamplifier and a second preamplifier; and a writer assembly including a first write coil independently driven by the first preamplifier and a second write coil independently driven by the second preamplifier.

Other implementations are also described and recited herein.

BRIEF DESCRIPTIONS OF THE DRAWINGS

DETAILED DESCRIPTIONS

Figure 1:
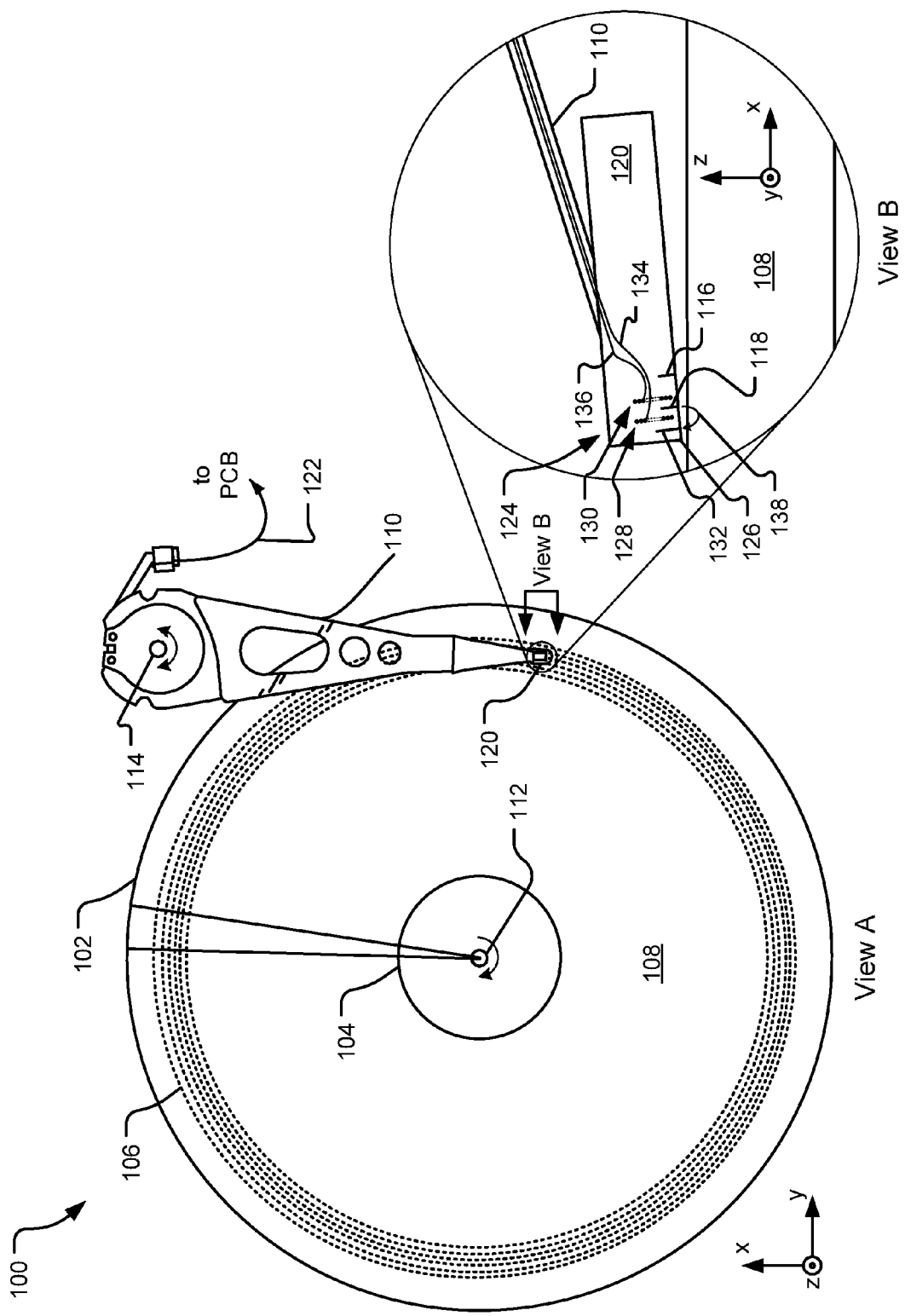
FIG. 1 illustrates an example hard disc drive assembly including two independently driven write coils mounted on a slider located at a distal end of an actuator arm and positioned over a storage media disc.

FIG. 1 illustrates an example hard disc drive or HDD assembly 100 including two independently driven write coils 128, 130 mounted on a slider 120 located at a distal end of an actuator arm 110 and positioned over a storage media disc (or platter) 108. Referring specifically to View A (x-y plane), the disc 108 includes an outer diameter 102 and an inner diameter 104 between which are a number of substantially circular data tracks (e.g., track 106) illustrated by circular dotted lines. In one implementation, the disc 108 rotates at a high speed about disc axis of rotation 112 as information is written to and read from the data tracks on the disc 108. Further, the disc rotation speed may be fixed or variable.

Information may be written to and read from the disc 108 through the use of an actuator arm 110. The actuator arm 110 rotates about an actuator axis of rotation 114 during a seek operation to locate a desired data track and sector on the disc 108. Specific locations on the media disc 108 may defined by any available addressing scheme. Example schemes include cylinder-head-sector (CHS) addressing and logical block addressing (LBA) schemes. The actuator arm 110 extends toward the disc 108 and the slider 120 is located at the distal end of the actuator arm 110. The slider 120 flies in close proximity above the disc 108 while reading and writing data to the disc 108. In other implementations, there is more than one slider 120, actuator arm 110, and/or disc 108 in the disc drive assembly 100.

A flex cable 122 provides the requisite electrical connection paths from a printed circuit board (PCB, not shown) to electronic components attached to the slider 120 (e.g., a read element 116 and the write coils 128, 130) while allowing pivotal movement of the actuator arm 110 during operation. The flex cable 122 may be routed along the actuator arm 110 from the PCB to the slider 120. The PCB may include circuitry (e.g., preamplifiers or preamps) for controlling the write currents applied to the write coils 128, 130 during a write operation and amplifying read signals generated by the read element 116 during a read operation, for example. See FIG. 2 for details regarding the write coils 128, 130 and FIG. 4 for details regarding the preamps corresponding to each write coil.

A side view of the slider 120 is shown in detail in View B of the x-z plane of FIG. 1 and includes the read element 116, the write coils 128, 130, a write pole 118, and a return pole 132, all of which are located near a trailing edge 126 of the slider 120. Other microelectronic components may also be mounted near the trailing edge 126 or on other areas of the slider 120. The appearances of the slider 120 and other features of assembly 100 are for illustration purposes only and not drawn to scale. The write coils 128, 130, the write pole 118, and the return pole 132 may be referred to in total as a writer assembly 124.

The disc 108 has a multitude of independent magnetic domains embedded within the disc 108 and the disc 108 generally moves in the negative x-direction with respect to the slider 120 in View B. The read element 116 is magneto resistive (i.e., it has a resistance value that varies with magnetic field and polarity of the magnetic domains of the underlying disc 108 as they pass underneath the read element 116), which allows the read element 116 to read data from the underlying disc 108.

The write coils 128, 130 are each operated independently from one another and electrically connected to a dedicated preamp (not shown) on the PCB via wire pairs 134, 136 respectively. The write coils 128, 130 each receive an electric current from the corresponding preamp via the wire pairs 134, 136 and convert the received electric current into a magnetic field. A cumulative (or combined) magnetic field generated by the write coils 128, 130 is directed to the underlying disc 108 via the write pole 118 and the return pole 132 (as illustrated by arrow 138). The magnetic field changes the magnetic polarity of the magnetic domains of the disc 108 as they pass underneath the write pole 118. This allows the writer assembly 124 to write data to the underlying disc 108.

By varying the current applied to each of the write coils 128, 130 independently, the cumulative magnetic write field may be fine tuned for a particular operation or HDD configuration. More specifically, one or more of the cumulative magnetic write field angle, magnitude, gradient, overshoot amplitude, overshoot duration, and phase may be fine tuned by independently varying the current applied to each of the write coils 128, 130. Fine tuning the current applied to each of the write coils 128, 130 is discussed in more detail with regard to FIG. 2. Further, fine tuning the write coils 128, 130 themselves is also discussed in more detail with regard to FIG. 2.

The magnetic write field angle and magnitude refers to the magnetic write field vector direction and magnitude with reference to the slider 120 air bearing surface. The magnetic write field gradient refers to a rate of change of the magnetic write field magnitude per unit of distance along a data track of the disc 108. Overshoot amplitude refers to a temporary increase in write current magnitude following a change in write coil current polarity as compared to a steady state write current magnitude. Overshoot duration refers to the duration of the temporary increase. The overshoot may improve the writer assembly 124 performance to shift the magnetic polarity of magnetic domains passing beneath the writer assembly 124. Phase refers to a difference in waveform phase when comparing the current signal applied to the write coil 128 to the signal current applied to the write coil 130.

The presently disclosed technology may apply to storage drive assemblies other than the disc drive subassembly 100 depicted in FIG. 1. Further, the presently disclosed technology may be used to write data to planar surfaces other than rotating discs such as disc 108.

Figure 2:
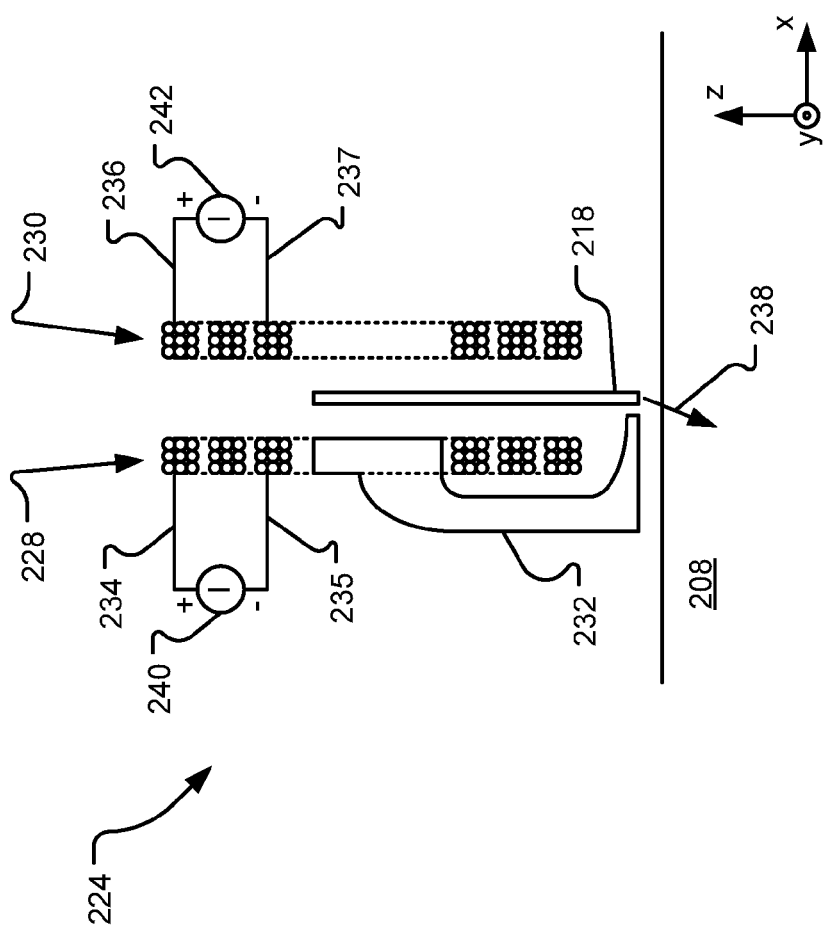
FIG. 2 is a cross-sectional view of a writer assembly including two independently driven write coils.

FIG. 2 is a cross-sectional view of a writer assembly 224 including two independently driven write coils 228, 230. The cross-section view of FIG. 2 is cut across the middle of the write coils 228, 230, which are relatively planar (i.e., pancake-style) coils, each coiled about an axis oriented generally in the x-direction. The write coils 228, 230 are depicted as having substantially three turns and include bundles of individual wire strands in each turn.

In other implementations, each turn in the write coils 228, 230 includes a singular wire strand. Further, one or both of the write coils 228, 230 may have greater or fewer turns than the depicted three depending on desired performance characteristics of the write coils 228, 230. In other implementations, there are more than two independently driven write coils. Still further, while the write coils depicted in FIGS. 1-4 are relatively planar coils that are coiled about an axis oriented generally in the x-direction, other implementations may use a helical-style for one or both of the write coils 228, 230, which may be coiled about an axis oriented generally in the z-direction.

The write coils 228, 230 are oriented on opposite sides of a write pole 218 and generate a cumulative (or combined) write field vector (illustrated by arrow 238) that is directed to an underlying disc 208 via the write pole 218 and returns to the writer assembly 224 via the return pole 232. The current driven though the write coils 228, 230 creates a magnetic field that changes the magnetic polarity of magnetic domains of the disc 208 as they pass underneath the write pole 218. This allows the writer assembly 224 to write data to the disc 208. The relative orientation of each of the write coils 228, 230 within the writer assembly 224 may vary depending on desired performance characteristics.

The cumulative write field vector (illustrated by arrow 238) is depicted a having a negative x-direction component. This suggests that the current magnitude, direction, and/or phase flowing through write coil 228, combined with geometric properties of the writer assembly 224 (including the write pole 218 and writer shields (not shown)) causes the output magnetic flux of the write coil 228 to outweigh that of the write coil 230. In other implementations, the output magnetic flux of the write coil 230 outweighs that of write coil 228, which would change the cumulative write field to have a positive x-direction component.

The write coils 228, 230 operate independently from one another. More specifically, the write coil 228 is connected to preamp 240 via wires 234, 235. The preamp 240 applies a specified (or predetermined) electrical current to the write coil 228 to generate a desired write field from the write coil 228. Similarly, the write coil 230 is connected to preamp 242 via wires 236, 237. The preamp 242 applies a specified electrical current to the write coil 230 to generate a desired write field from the write coil 230. The magnetic write fields generated by each of the write coils 228, 230 combine to generate a combined desired write field vector (as illustrated by arrow 238).

While each of the preamps 240, 242 are depicted as generating a current with a particular polarity, in other implementations, one or both of the preamps 240, 242 generate a current with the opposite polarity. In further implementations, the magnitude, polarity, and/or relative phase of the current generated by each of the preamps 240, 242 may vary over time.

By varying the current applied to each of the write coils 228, 230 independently, the cumulative magnetic write field may be fine tuned for a particular operation or HDD configuration. More specifically, one or more of the cumulative magnetic write field angle, magnitude, gradient, overshoot amplitude, overshoot duration, and phase may be fine tuned by independently varying the current applied to each of the write coils 228, 230.

In one implementation, application of about 50 milliamps to the write coil 228 and about 30 milliamps to write coil 230, or vice versa achieves superior performance compared to write coils 228, 230 each receiving about 40 milliamps, which would be achievable with a conventional writer coils electrically connected in series. While this example implementation assumes an unchanged total magnetomotive force (MMF) of 80 milliamps multiplied by the total number of coil turns in each of the write coils 228, 230, other implementations may vary the total MMF to achieve desirable performance characteristics.

Figure 3:
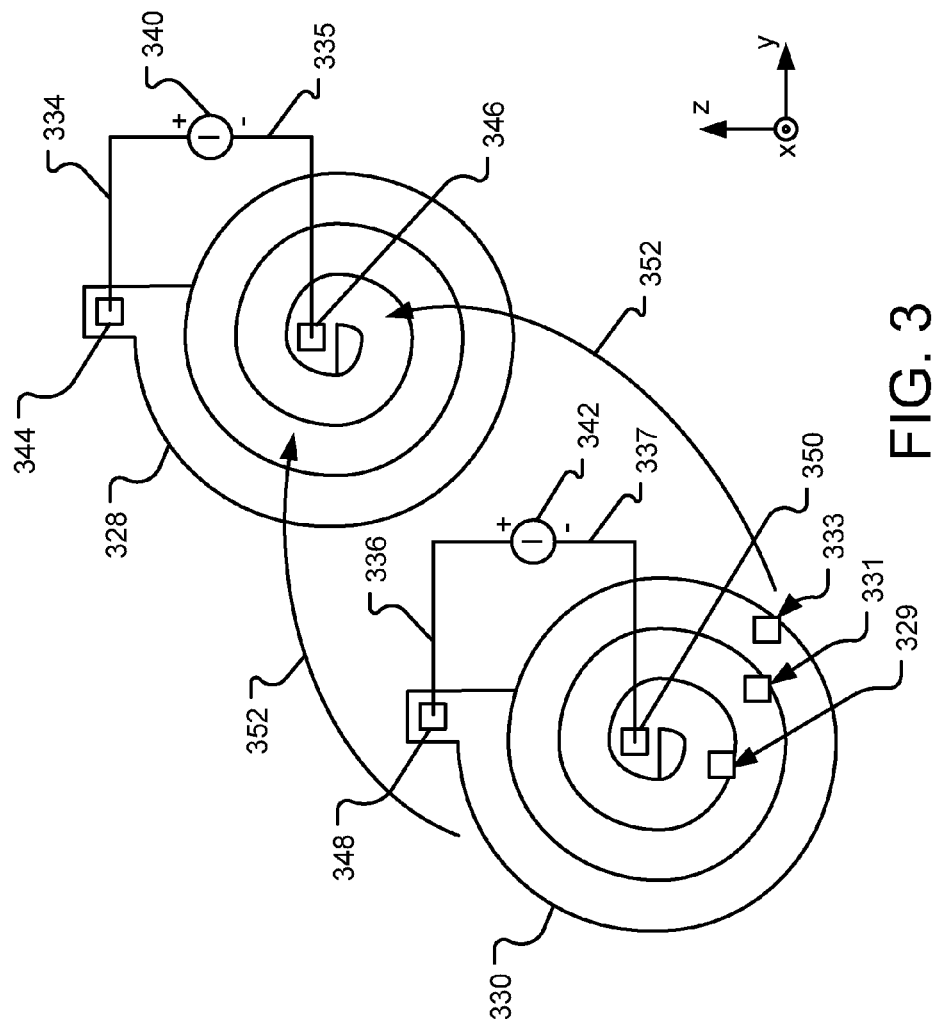
FIG. 3 is an exploded plan view of two independently driven write coils for a writer assembly.

FIG. 3 is an exploded plan view of two independently driven write coils 328, 330 for a writer assembly (not shown). Each of the write coils 328, 330 are relatively planar (i.e., pancake-style) coils and coiled around an axis oriented generally in the x-direction. The write coils 328, 330 are depicted as having substantially three turns, with electrical contact pads 344, 346, 348, 350 at an end of the innermost and outermost turns. More specifically, write coil 328 includes the electrical contact pad 344 at its outermost turn and the electrical contact pad 346 at its innermost turn. Similarly, write coil 330 includes the electrical contact pad 348 at its outermost turn and the electrical contact pad 350 at its innermost turn. In other implementations, one or both of the write coils 328, 330 may have greater or fewer turns than three depending on desired performance characteristics of the write coils 328, 330. In other implementations, there are more than two independently driven write coils.

In the depicted implementation, the write coils 328, 330 stacked over one another in the y-z plane (as illustrated by arrows 352), where the write coil 328 would be hidden by the write coil 330 if depicted in an assembled orientation. In other implementations, the write coils 328, 330 are in other orientations with respect to one another and the various orientations may be optimized to achieve desired performance characteristics.

The write coils 328, 330 operate independently from one another. More specifically, the write coil 328 is connected to preamp 340 via wires 334, 335. The preamp 340 applies a specified (or predetermined) electrical current to the write coil 328 to generate a desired write field from the write coil 328. Similarly, the write coil 330 is connected to preamp 342 via wires 336, 337. The preamp 342 applies a specified (or predetermined) electrical current to the write coil 330 to generate a desired write field from the write coil 330. The magnetic write fields generated by each of the write coils 328, 330 combine to generate a combined desired write field (not shown).

The write coils 328, 330, contact pads 344, 346, 348, 350, and wires 334, 335, 336, 337 may be constructed of any available electrically conductive metal or metallic alloy (e.g., copper and gold alloys). Further, while each of the preamps 340, 342 are depicted as generating a current with a particular polarity, in other implementations, one or both of the preamps 340, 342 generate a current with the opposite polarity. In further implementations, the magnitude, relative phase, and/or polarity of the current generated by each of the preamps 340, 342 varies over time.

By varying the current applied to each of the write coils 328, 330 independently, the cumulative magnetic write field may be fine tuned for a particular operation or HDD configuration. More specifically, one or more of the cumulative magnetic write field angle, magnitude, gradient, overshoot amplitude, overshoot duration, and phase may be fine tuned by independently varying the current applied to each of the write coils 328, 330.

In another implementation, there may be supplementary bond pads (e.g., 329, 331, and 333) located at different turns within each of the write coils 328, 330. For example, each of write coils 328, 330 may have a supplementary bond pad located at the second turn. This gives the flexibility to engage all three turns, two turns, or one turn of each of the write coils 328, 330 depending on the pair of bond pads selected for use. The selected bond pads may change during operation of a corresponding storage drive to optimize the performance characteristics of the storage drive.

Figure 4:
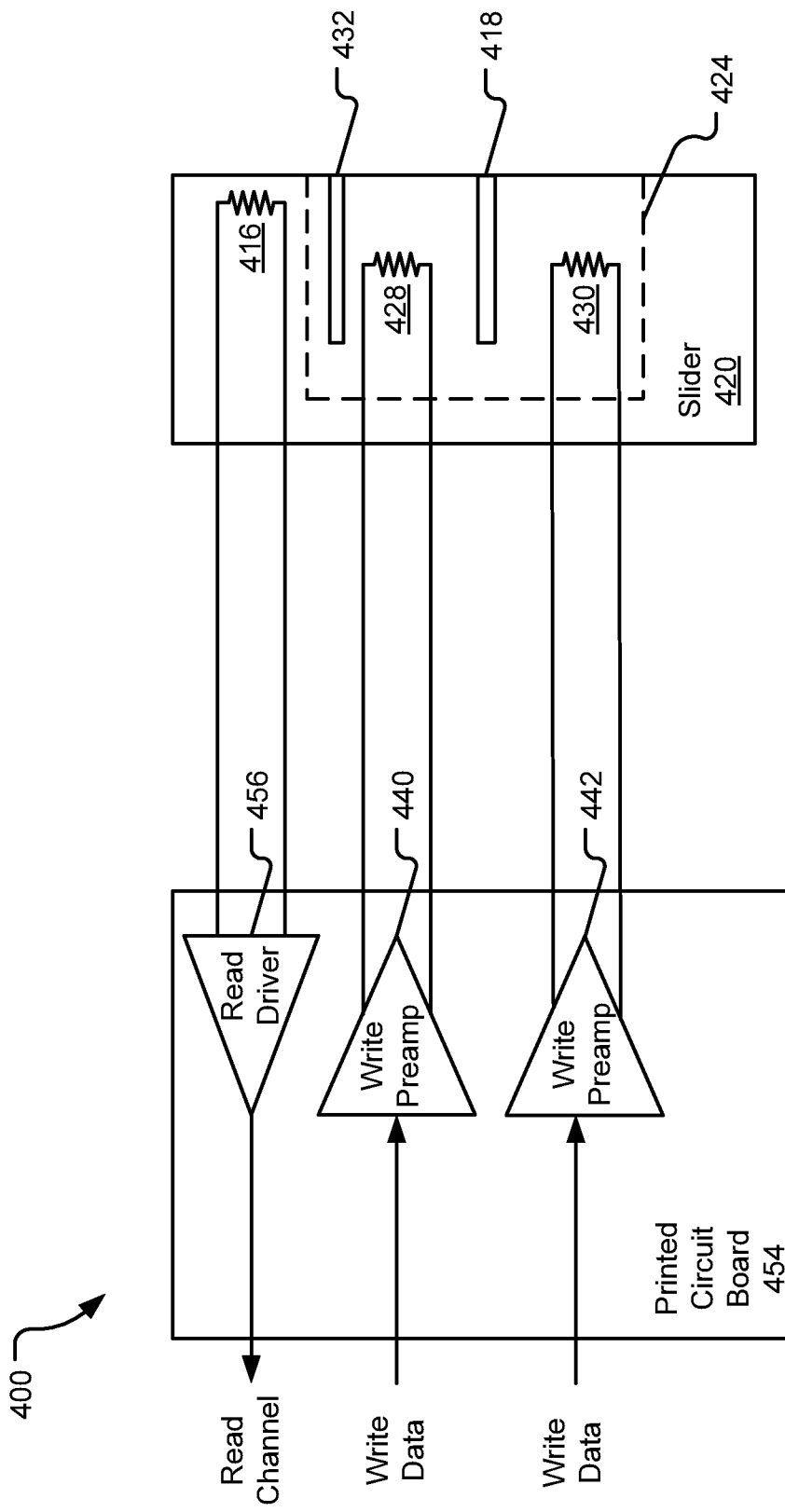
FIG. 4 illustrates an example circuit diagram for a writer assembly including two independently driven write coils.

FIG. 4 illustrates an example circuit diagram 400 for a writer assembly 424 including two independently driven write coils 428, 430. The circuit diagram 400 includes a slider 420 electrically connected to a printed circuit board (PCB) 454. The slider 420 includes a read element 416 and the writer assembly 424, which further includes the write coils 428, 430, a write pole 418 and a return pole 432. The slider 420 flies in close proximity above a storage media surface (not shown) as data is read from the storage media using the read element 416 and written to the storage media using the writer assembly 424.

The PCB 454 includes a read driver 456, and preamps 440, 442 which drive the write coils 428, 430, respectively. The read driver 456 processes a read signal received from the read element 416 and sends the read signal out to a read channel. The preamps 440, 442 process incoming write data and output electrical signals to the write coils 428, 430 that correspond to the write data. The write coils 428, 430 create a combined magnetic field that is directed to the storage media via the write pole 418 and the return pole 432. The combined magnetic field selectively switches the polarity of magnetic domains on the storage media to write the write data to the storage media.

Figure 5:
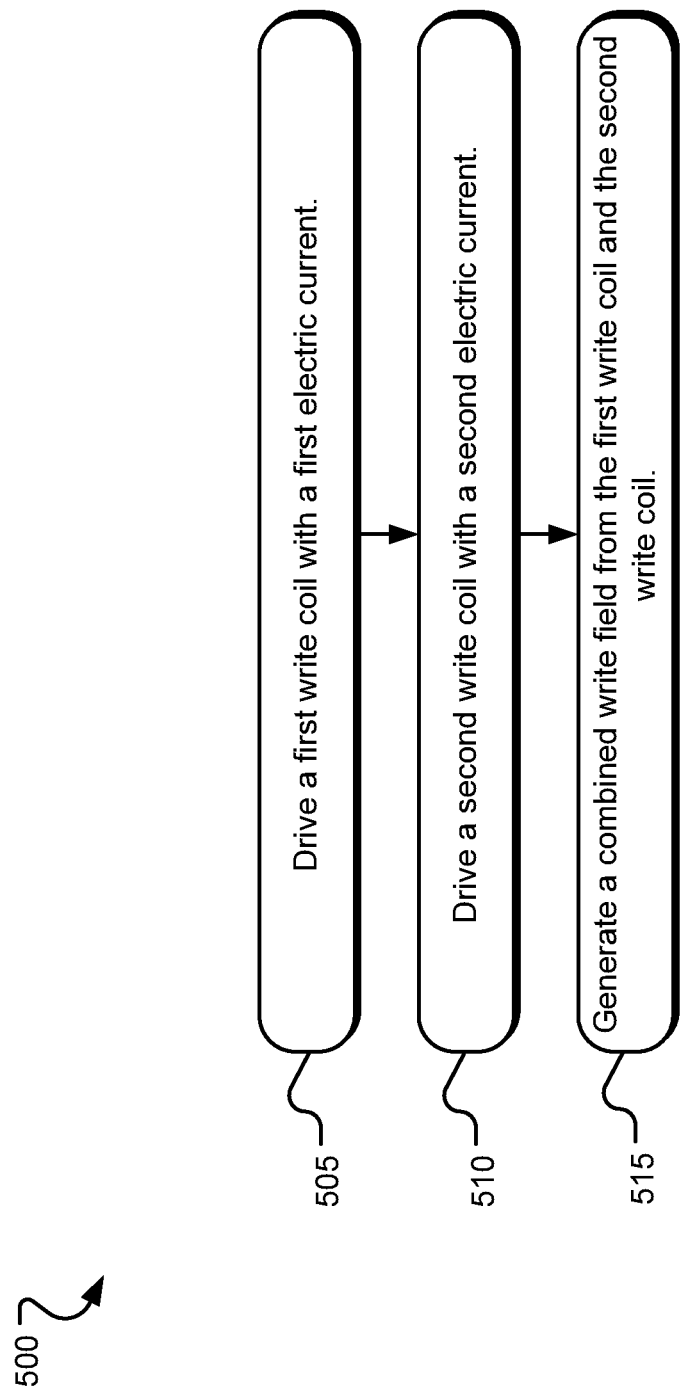
FIG. 5 illustrates example operations for using a writer assembly including two independently driven write coils.

FIG. 5 illustrates example operations 500 for using a writer assembly including two independently driven write coils. A first driving operation 505 drives a first write coil with a first electric current. In one implementation, a first preamplifier on a circuit board generates the first electric current. A second driving operation 510 drives a second write coil with a second electric current. In one implementation, a second preamplifier on the circuit board generates the second electric current.

A generating operation 515 generates a combined write field from the first write coil and the second write coil. More specifically, the first write coil converts the electric current from the first preamplifier into a first magnetic write field. The second write coil converts the electric current from the second preamplifier into a second magnetic write field. The first magnetic write field and the second magnetic write field combine into the combined write field. The combined write field is used to write data to a storage media by changing the polarity of selected magnetic domains on the storage media.

In one implementation, the writer assembly with independently driven write coils is used in production storage drives to selectively write data to a storage media within the storage drives. For example, the MMF for each write coil may be adjusted at commissioning of individual production storage drives to maximize performance for a particular application and/or compensate for variations in drive manufacturing. Further, performance may vary substantially depending on the particular head (e.g., head 1, head 2, etc.) and location (e.g., located near the platter inner diameter or near the platter outer diameter) within the storage drive. A look-up table containing MMF values for each write coil depending on the particular head and its current location may be used to optimize the write performance of the writer assembly in real time.

In other implementations, the writer assembly with independently driven write coils is used as a metrology device to configure various storage drive heads, media, and head-media combinations for production storage drives. The metrology device writer assembly with independently driven write coils may be used to vary the input parameters of the write coils over time to determine what configuration achieves the best performance. Other writer assemblies may be designed to achieve a similar optimized write field as that achieved by the metrology writer assembly.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
independently driving at least two currents to at least two write coils within a writer assembly using separate preamplifiers, wherein the separate preamplifiers drive the at least two write coils using one or both of different current magnitudes and phases, wherein the at least two write coils generate individual write fields that yield a combined write field directed to a storage media, and wherein the combined write field is directed to the storage media via a shared write pole and a shared return pole to write data to the storage media.

2. The method of claim 1, wherein the at least two write coils are oriented on opposite sides of the shared write pole.

3. The method of claim 1, wherein each of the at least two write coils have one of a substantially planar orientation and a substantially helical orientation.

4. The method of claim 1, wherein at least one of the write coils utilizes at least three bond pads located on different turns of the write coil.

5. The method of claim 1, further comprising independently varying at least one of cumulative magnetic write field angle, gradient, overshoot amplitude, overshoot duration, and phase of at least two write coils.

6. The method of claim 1, further comprising independently varying an overshoot characteristic of at least two write coils.

7. The method of claim 1, further comprising independently varying a phase characteristic of at least two write coils.

8. A writer assembly comprising:
a first write coil independently driven by a first current by a first preamplifier; and
a second write coil independently driven by a second current by a second preamplifier, wherein the first preamplifier drives the first write coil and the second preamplifier drives the second write coil using one or both of different current magnitudes and phases, wherein the first write coil and the second write coil generate individual write fields that yield a combined write field, and wherein the combined write field is directed to the storage media via a shared write pole and a shared return pole to write data to the storage media.

9. The writer assembly of claim 8, wherein the first write coil and the second write coil are oriented on opposite sides of the shared write pole.

10. The writer assembly of claim 8, wherein each of the first write coil and the second write coil have one of a substantially planar orientation and a substantially helical orientation.

11. The writer assembly of claim 8, wherein at least one of the first write coil and the second write coil utilizes at least three bond pads located on different turns of the write coil.

12. A system comprising:
a printed circuit board including a first preamplifier and a second preamplifier; and
a writer assembly including a first write coil independently driven by a first current from the first preamplifier and a second write coil independently driven by a second current by the second preamplifier, wherein the first preamplifier drives the first write coil and the second preamplifier drives the second write coil using one or both of different current magnitudes and phases, wherein the first write coil and the second write coil generate individual write fields that yield a combined write field, and wherein the combined write field is directed to the storage media via a shared write pole and a shared return pole to write data to the storage media.

13. The system of claim 12, wherein each of the first write coil and the second write coil have one of a substantially planar orientation and a substantially helical orientation.

14. The system of claim 12, wherein at least one of the first write coil and the second write coil utilizes at least three bond pads located on different turns of the write coil.

* * * * *